United States Patent [19]
Kurzeja

[11] 3,964,924
[45] June 22, 1976

[54] PROTECTIVE COATING FOR GRAPHITE ELECTRODES

[75] Inventor: Ronald Kurzeja, Iselin, N.J.

[73] Assignee: Pfizer Inc., New York, N.Y.

[22] Filed: July 11, 1975

[21] Appl. No.: 596,021

[52] U.S. Cl. .............................. 106/286; 252/506; 428/408
[51] Int. Cl.² .............................. C09D 1/00
[58] Field of Search ............ 106/286; 427/113, 114, 427/122; 428/408; 252/502, 506, 512

[56] References Cited
UNITED STATES PATENTS

| | | | |
|---|---|---|---|
| 2,803,566 | 8/1957 | Johannsen | 427/122 |
| 3,485,645 | 12/1969 | MacKenzie | 252/502 |
| 3,711,428 | 1/1973 | Aycock | 252/502 |

OTHER PUBLICATIONS

Chem. Abst. 69.39,808u.

*Primary Examiner*—Theodore Morris
*Attorney, Agent, or Firm*—Francis X. Murphy; Charles J. Knuth; Allen J. Spiegel

[57] ABSTRACT

A coating composition for the protection of graphite electrodes comprising a water dispersion of the following ingredients based on total solids: 35 to 65 percent oxide-coated particulate silicon, 15 to 40 percent colloidal silica, 2 to 10 percent powdered carbon and 5 to 20 percent ground glass.

4 Claims, No Drawings

PROTECTIVE COATING FOR GRAPHITE ELECTRODES

BACKGROUND OF THE INVENTION

This invention relates to protective coatings. More specifically, it relates to coatings for preventing high temperature oxidation of the graphite electrodes of electric arc steelmaking furnaces.

Steelmaking by the electric arc furnace accounts for a considerable portion of the world's steel production, especially of higher alloy and stainless steels. Because of its many advantages, such as its greater scheduling flexibility and its capability to produce practically all the known grades of steel including those with very low residual phosphorus and sulfur contents, the electric arc furnace process is receiving increased usage by steelmakers. The electrodes of electric arc steelmaking furnaces are made almost exclusively of graphite. Vast amounts of graphite are consumed during the steelmaking, the cost of electrode replacement being exceeded only by the cost of the steel scrap charge and the electrical power. A number of destructive mechanisms are responsible for the high electrode consumption and include sidewall oxidation, arc tip erosion, breakage, slag attack and hot metal attack. While little can be done to minimize the latter four mechanisms, development of an impermeable coating that will keep oxygen from reaching the graphite surface of the electrode would minimize and possibly eliminate the sidewall wear. It is therefore a primary object of this invention to provide such a protection in the form of an inexpensive and easily applied coating composition.

Many methods have been used to provide a suitable coating for the prevention of high-temperature oxidation of graphite electrodes and other graphite surfaces, these methods usually involving the formation of a silicon carbide layer. For example, in British Patent 866,818, silicon powder is applied and bonded to a graphite body such as by flame spraying; subsequent localized heating of the silicon is said to cause it to melt and simultaneously flow into and react with the graphite body to form a silicon carbide protective coating. In U.S. Pat. No. 3,275,471, a graphite component is dipped into a suspension of about equal amounts of finely divided silicon and silicon carbide, optionally with added carboxymethylcellulose, and subsequently fired at 1415° to 1500°C. for 5 to 25 seconds to produce a protective coating of silicon containing dispersed silicon carbide. And in British Patent 1,166,429, the graphite body is coated with a primary layer of silicon and a metallic surfacing layer of aluminum; preferably the layers are applied by flame spraying, and the body is heated to above 550°C. to cause the components of the two layers to form a low-melting eutectic alloy and the silicon to react with the graphite body to form silicon carbide. An aqueous solution of alkali metal phosphate, borate or silicate may be applied to the surface layer to form a sealing layer. None of these methods, however, allows for the application of the protective coating to graphite electrodes in a simple and inexpensive manner, especially under the operating conditions of the electric arc steelmaking process.

SUMMARY OF THE INVENTION

We have now discovered a novel combination of ingredients which can be readily and economically applied to graphite electrodes, either prior to use or between steelmaking heats, to protect the electrodes from high-temperature oxidation. Specifically, we have developed a coating composition for the protection of graphite electrodes comprising a water dispersion of the following ingredients expressed in weight percent based on total solids: from about 35 to 65 percent oxide-coated particulate silicon, from about 15 to 40 percent colloidal silica, from about 2 to 10 percent powdered carbon and from about 5 to 20 percent ground glass. Preferably, the water constitutes from about 50 to 65 weight percent of the composition and the oxide coating constitutes from about 15 to 40 weight percent of the oxide-coated silicon.

DETAILED DESCRIPTION OF THE INVENTION

The composition of this invention, in addition to being inexpensive and easily applied, even during steelmaking operations, forms a closely adherent coating which offers remarkable protection to graphite electrodes against oxidation under the conditions for steel production in electric arc furnaces.

The oxide-coated particulate silicon which constitutes from about 35 to 60 weight percent of the solids content of the composition, reacts, beginning at a temperature of about 2700°F (1480°C), with both the surface of the graphite electrode and with the powdered carbon present in the coating composition to form the refractory silicon carbide, which is believed to contribute the major portion of the oxidation resistance of the coating. Oxide-coated silicon levels below about 35 percent result in insufficient silicon carbide formation to be effective while levels above about 60 percent prevent the presence of the other ingredients in the composition in sufficient amounts to fulfill their roles. The preferred level is about 50 percent.

Since silicon metal readily reacts with water, the particulate silicon cannot be incorporated as such in the preparation of stable coating compositions. The metal is therefore initially treated to develop an oxide coating around each of the particles. The silicon metal used in the preparation is typically of a purity of about 97 weight percent or greater, the remainder being mainly iron, calcium and aluminum. The metal is supplied in a number of sizings and, if required, is ground, such as by dry ball milling, to the extend that the particles substantially all pass a 70 mesh sieve. A typical particulate silicon would have the following particle size distribution:

| Particle Size ($\mu$) | % Finer than |
|---|---|
| 100 | 100 |
| 80 | 94–100 |
| 60 | 84–100 |
| 50 | 75–100 |
| 40 | 66–100 |
| 30 | 54–100 |
| 20 | 40–100 |
| 10 | 23–83 |
| 8 | 19–74 |
| 6 | 14–63 |
| 4 | 10–48 |
| 2 | 4–29 |
| 1 | 1–17 |
| 0.5 | 0–9 |
| 0.2 | 0–1 |

An oxide coating, expressed as $SiO_2$, constituting from about 10 to 60 weight percent of the coated silicon is readily developed by heating the particulate silicon in air at a temperature of from about 900° to 1700°F (480° to 930°C) for a period of from about 0.5 to 2 hours. Below about 900°F (480°C) the rate of oxide formation is uneconomically slow, while above about 1700°F (930°C) the particulate silicon tends to sinter. Preferably the treatment is for about 1 hour at about 1200° to 1400°F (650° to 760°C) to develop an oxide coating of about 15 to 40 weight percent of the coated silicon. The treatment may be accomplished, for example, in a crucible in which the particulate silicon is present to a depth of about 2 to 2.5 inches (5 to 6 cm) or in a rotary calciner. Use of the oxide-coated silicon thus prepared in place of silicon metal increases the storage life of the coating composition prior to application to the electrode from about 15 to 30 minutes to as much as 24 to 48 hours.

The colloidal silica present in the coating composition serves as a binder. As the water content of the composition evaporates following application of the composition to the graphite electrode, the colloidal silica gels and forms a dense reticular structure which binds the solid particles of the composition both to one another and to the surface of the electrode. This action provides a rigid chemically inert coating on the electrode until such time when silicon carbide formation, as hereinbefore described, is effected. The colloidal silica content of the compositon ranges from about 15 to 40 weight percent of the total solids. Amounts less than about 15 percent are ineffective while amounts greater than about 40 percent do not further improve the silica's binding action. The preferred amount is about 25 percent.

The silica is incorporated into the composition in the form of a stable aqueous dispersion in which the particle size of the silica is normally about 5 to 25 millimicrons and the silica solids content is normally about 30 to 50 weight percent. Suitable commercially available dispersions include those supplied by DuPont Industrial Chemicals Department, Wilmington, Del., under the tradename LUDOX, by Nalco Chemical Company, Chicago, Ill., under the tradename NALCOAG and by Monsanto Company, St. Louis, Mo., under the tradename SYTON. Since the silica addition is an aqueous dispersion, careful selection of the dispersion solids content may result in satisfying the desired levels of both the silica and the water in the composition. A particularly desirable colloidal silica is one with a silica solids content of 40 weight percent sold by DuPont under the product name LUDOX HS-40%.

The powdered carbon of the composition assists in the total silicon carbide formation in the coating, consuming a portion of the silicon content of the composition in excess of that reacting with the surface of the graphite electrode. Powdered carbon levels less than about 2 weight percent of the solids content of the composition are too low to be effective while levels substantially above about 10 percent inhibit silicon carbide formation at the electrode surface. The preferred level is about 9 percent. The powdered carbon may be either carbon or graphite and preferably is of such particle size that substantially all the powder passes a 100-mesh sieve.

The ground glass, by supplying a molten phase to the coating composition at the elevated temperatures of electrode operation, serves both as a catalyst to promote silicon carbide formation and as a sealant for the cracks and pinholes which may develop in the coating. Glass levels in the composition below about 5 weight percent of the total solids content of the composition are not sufficiently effective for these purposes while levels substantially above about 20 percent cause the coating to flow. The preferred level is about 15 percent. Any glass having a softening point in the range of from about 650° to 750°C may be used, the glass after grinding normally being such that it substantially all passes a 100-mesh sieve. Such a glass, for example, is that supplied by Potter Industries, Inc., Carlstadt, N.J., under the product name D-Dust and analyzing 71–73 weight percent $SiO_2$, 12–14 percent $Na_2O$, 10–12 percent CaO, 1–4 percent MgO and 0.5–1.5 percent $Al_2O_3$.

The coating composition of this invention can be readily applied to graphite electrodes by standard coating techniques such as brushing and spraying. The composition is particularly suitable for application by spraying to hot electrodes and therefore permits the formation of protective coatings not only on new electrodes but also on worn electrodes between steelmaking heats without interrruption of the steelmaking process. Water contents of from about 50 to 65 weight percent of the composition are preferred to provide the proper fluidity for such spray application, while water contents of from about 20 to 40 weight percent are best suited for brushing.

Since the composition has a limited storage life of about 24 to 48 hours, it is normally supplied as a 2-package kit. One package of the kit contains a blend of the oxide-coated particulate silicon, powdered carbon and ground glass while the other package contains the aqueous dispersion of colloidal silica. The contents of the two packages plus additional water if required are combined by mixing shortly before application to the graphite electrode.

The following examples are merely illustrative and are not to be construed as limiting the invention, the scope of which is defined by the claims. All references to mesh size in the disclosure, including the examples, are based on the U.S. Sieve Series (ASTM E-11-61); see Lange's Handbook of Chemistry, 11th Edition, Section 11, page 2 (1973).

EXAMPLE 1

Silicon metal nuggets were ground in a dry ball mill and the resulting powder was screened through a 70-mesh sieve. The screened powder was then heated in air, for one hour at 1200°F (650°C), to develop an oxide coating on the silicon particles. The oxide-coated silicon (38 weight percent oxide coating) was blended with powdered graphite (−100 mesh) and ground glass (−100 mesh) and the resulting blend was mixed into a 40 weight percent dispersion of colloidal silica in water[1] to give a coating composition of the following makeup:

| Ingredient | Weight Percent As Is | Total Solids (Dry) Basis |
|---|---|---|
| oxide-coated silicon | 36.36 | 50.0 |
| colloidal silica (as $SiO_2$) | 18.18 | 25.0 |
| powdered graphite | 6.61 | 9.1 |
| ground glass | 11.57 | 15.9 |
| water | 27.28 | — |

Half of one flat surface of a graphite[2] cylinder 4 inches (10.2 cm) in diameter and 1.5 inches (3.8 cm) long was coated by brushing with the above composition. The coating was allowed to dry and the cylinder was then placed in a propane-fired furnace such that the partially coated surface of the cylinder was exposed to an oxidizing atmosphere at 2900°F (1590°C) for 30 minutes. Examination of the cylinder following the exposure revealed that a substantial amount of the graphite, about ⅜ inch (1.0 cm) along the axial dimension, had been removed by oxidation from the uncoated region while no graphite was lost from the coated region. Except for some minor surface defects such as small pinholes, the exposed coated surface appeared coherent and well bonded to the graphite.

(1) Dupont LUDOX HS-40%
(2) AGX grade graphite supplied by Union Carbide Corporation, New York, New York.

The above composition may be diluted with additional water to obtain the preferred composition for spray application, namely 60 weight percent water, 20 weight percent oxide-coated particulate silicon, 10 weight percent colloidal silica, 3.5 weight percent powdered carbon and 6.5 weight percent ground glass. Comparable test results will be realized.

EXAMPLE 2

The testing of Example 1 can be repeated using a coating of the following composition and application by brushing with substantially the same results:

| Ingredient | Weight Percent As Is | Total Solids (Dry) Basis |
| --- | --- | --- |
| oxide-coated silicon(1) | 53.1 | 65.0 |
| colloidal silica (as SiO$_2$) | 12.2 | 15.0 |
| powdered carbon | 8.2 | 10.0 |
| ground glass | 8.2 | 10.0 |
| water | 18.3 | — |

(1)oxide coating 60 weight percent

EXAMPLE 3

The testing of Example 1 can be repeated using a coating of the following composition and application by spraying with substantially the same results:

| Ingredient | Weight Percent As Is | Total Solids (Dry) Basis |
| --- | --- | --- |
| oxide-coated silicon(1) | 12.25 | 35.0 |
| colloidal silica (as SiO$_2$) | 14.0 | 40.0 |
| powdered carbon | 1.75 | 5.0 |
| ground glass | 7.0 | 20.0 |
| water | 65.0 | — |

(1)oxide coating 10 weight percent

EXAMPLE 4

The testing of Example 1 can be repeated using a coating of the following composition and application by spraying with substantially the same results:

| Ingredient | Weight Percent As Is | Total Solids (Dry) Basis |
| --- | --- | --- |
| oxide-coated silicon(1) | 32.5 | 65.0 |
| colloidal silica (as SiO$_2$) | 14.0 | 28.0 |
| powdered carbon | 1.0 | 2.0 |
| ground glass | 2.5 | 5.0 |
| water | 50.0 | — |

(1)oxide coating 15 weight percent

EXAMPLE 5

The composition of Example 1 was applied to one of three partially worn graphite electrodes which had been taken out of service from an electric arc steelmaking furnace during a shutdown for repairs. The coating was applied in three brushings to the warm electrode so that the coating covered a 10-foot (305 cm) length of the 14-inch (35.6 cm) diameter electrode, from the tip of the electrode to a point just short of the clamp marks, and extended around the electrode for about two-thirds of its circumference. Estimated coated area was 23.3 ft$^2$ (21,650 cm$^2$) and gross coating coverage was 0.68 lb/ft$^2$ (0.33 g/cm$^2$). After drying, the electrode was placed on top of the furnace.

The furnace was started up without difficulty. Observation of the electrode during melting revealed that most of the coating remained intact. Examination of the electrode during tapping revealed that the upper 6 feet (183 cm) of the coating was still intact and virtually unaffected by the furnace conditions while the lower 4 feet (122 cm) of the coating had been lost, probably from excessive slagging and/or arcing between the electrode sidewall and the scrap steel placed within the furnace. Use of the coating resulted in an estimated reduction of about 22 percent in graphite consumption.

What is claimed is:

1. A coating composition for the protection of graphite electrodes comprising a water dispersion, expressed in weight percent based on total solids, of from about 35 to 65 percent oxide-coated particulate silicon, from about 15 to 40 percent colloidal silica, from about 2 to 10 percent powdered carbon and from about 5 to 20 percent ground glass, the oxide coating of said coated silicon constituting from about 10 to 60 weight percent of said coated silicon and said glass having a softening point of from about 650° to 750°C.

2. The composition of claim 1 wherein said water constitutes from about 50 to 65 weight percent of said composition.

3. The composition of claim 1 wherein the oxide coating of said coated silicon constitutes from about 15 to 40 weight percent of said coated silicon.

4. A protective coating composition for graphite electrodes comprising about 60 weight percent water, about 20 weight percent oxide-coated particulate silicon, about 10 weight percent colloidal silica, about 3.5 weight percent powdered carbon and about 6.5 weight percent ground glass, the oxide coating of said coated silicon constituting from about 15 to 40 weight percent of said coated silicon and said glass having a softening point of from about 650° to 750°C.

* * * * *